United States Patent Office 2,806,057
Patented Sept. 10, 1957

2,806,057

HYDROXY - SUBSTITUTED TETRAHYDROPHTHALIC ACIDS, DERIVATIVES THEREOF, AND METHOD FOR PRODUCING THE SAME

Harry DeV. Finch, Berkeley, and Seaver A. Ballard, Orinda, Calif., assignors to Shell Development Company, Emeryville, Calif., a corporation of Delaware No Drawing. Application February 24, 1953,
Serial No. 338,563

2 Claims. (Cl. 260—514)

This invention relates to a new class of organic compounds and to a method for producing the same. More particularly, the invention relates to novel hydroxy-substituted tetrahydrophthalic acids, to a method for producing the same, and to utilization of the novel acids in preparing valuable derivatives, particularly improved polyester-type products.

Specifically, the invention provides new and useful 3-hydroxy - substituted 1,2,3,6 - tetrahydrophthalic acids which are preferably prepared by condensing a compound possessing a conjugated system of double bonds and having an acyloxy group attached to one of the exterior carbon atoms involved in the said conjugated system with a maleic acid or maleic acid anhydride so as to form an acyloxy-substituted 1,2,3,6-tetrahydrophthalic acid or anhydride and then subjecting this compound to hydrolysis to convert the acyloxy group to a hydroxyl group and the anhydride group to carboxyl groups.

The invention further provides new and valuable derivatives prepared from these acids, particularly the polyester-type products obtained by heating the above-described acids and/or their half esters by themselves or with polyhydric alcohols and/or carboxylic acid in the presence of an acid condensation catalyst.

This application is a continuation-in-part of our patent Application No. 16,148, filed March 20, 1948, now Patent No. 2,632,011, which in turn is a continuation-in-part of our patent application No. 554,862 filed September 19, 1944, now abandoned.

It is an object of the invention to provide a new class of organic compounds. It is a further object to provide new and useful hydroxy-substituted 1,2,3,6-tetrahydrophthalic acids and a method for their preparation. It is a further object to provide 3-hydroxy-substituted 1,2,3,6-tetrahydrophthalic acids that have many useful and valuable properties. It is a further object to provide 3-hydroxy-substituted 1,2,3,6-tetrahydrophthalic acids that may be used to produce improved polyester products. It is a further object to provide relatively high molecular weight polyesters of the 3-hydroxy-substituted 1,2,3,6-tetrahydrophthalic acids which have many useful and valuable properties. It is a further object to provide unsaturated esters of the above-described acids and useful polymers thereof. Other objects and advantages of the invention will be apparent from the following detailed description thereof.

It has now been discovered that these and other objects may be accomplished in part by novel 3-hydroxy-substituted 1,2,3,6-tetrahydrophthalic acids which are preferably prepared by condensing a compound possessing a conjugated system of double bonds and having an acyloxy group attached to one of the exterior carbon atoms involved in the said conjugated system with a maleic acid or maleic anhydride so as to form an acyloxy-substituted 1,2,3,6-tetrahydrophthalic acid or anhydride and then subjecting the resulting compound to hydrolysis to convert the acyloxy group to a hydroxyl group and the anhydride group to carboxyl groups. The unique structural arrangement of these acids, e. g., having a hydroxyl group attached to a carbon atom in an alpha position relative to an ethylenic linkage and in a beta position relative to a carboxyl group, endows the said acids with many usual and unobvious properties. Such acids may be used, for example, as medicaments or as intermediates in making medicaments and may be used as textile treatment agents and as intermediates in the preparation of dyes and pesticidal compositions.

The acids are particularly valuable, however, in the preparation of new and valuable polyester products. As they possess an ethylenic linkage and an additional carboxyl group, they are able to form polyester products having properties which distinguish them from the polyesters formed from the other hydroxy-substituted acids. The polyesters formed from these acids, for example, may have better drying and/or polymerizing properties due to the presence of the ethylenic group and additional drying and/or polymerizing components may be introduced by reacting the second carboxyl group with unsaturated alcohols, such as allyl alcohol and crotyl alcohol. When reacted with polyhydric alcohols to form alkyd-type resins, additional modifying agents may also be introduced through the hydroxyl group on the acid molecule. In addition, as the novel acids are aliphatic, the polyesters formed therefrom are generally free of the detrimental characteristics of the resins prepared from the aromatic-type acids, such as brittleness and lack of distensibility.

The acids also find special application in the preparation of monomeric esters of monohydric alcohols, such as amyl alcohol and allyl alcohol, which are useful as plasticizers or as intermediates in the formation of polymeric products. The ethylenically unsaturated esters of the novel acids may, for example, be polymerized with themselves or with certain proportions of other ethylenically unsaturated organic compounds to produce insoluble, infusible products having many useful properties.

The novel acids of the invention comprises the 1,2,3,6-tetrahydrophthalic acids having the number three ring carbon atom joined to a hydroxyl group, and preferably to a hydroxyl group and a hydrogen atom. The other ring carbon atoms may be substituted with other non-interfering substituents, such as halogen atoms, ether and ester radicals, hydrocarbon radicals, and the like, but are preferably attached to hydrogen, halogen or hydrocarbon radicals. Examples of the acids of the invention include 1-butyl-3-hydroxy-1,2,3,6-tetrahydrophthalic acid, 1,2-diethyl-3-hydroxy - 1,2,3,6 - tetrahydrophthalic acid, 3-hydroxy-5-chloro-1,2,3,6-tetrahydrophthalic acid, 3-hydroxy-4,5-dihexyl-1,2,3,6-tetrahydrophthalic acid, 3-hydroxy-5-methoxy-1,2,3,6-tetrahydrophthalic acid, 3-hydroxy-4-bromo-1,2,3,6-tetrahydrophthalic acid, 3-hydroxy-4,5-diisopropyl-1,2,3,6-tetrahydrophthalic acid, 1,2-dibutyl-3-hydroxy-5-octyl-1,2,3,6-tetrahydrophthalic acid, and 3-hydroxy-4-butoxy-1,2,3,6-tetrahydrophthalic acid.

The preferred acids of the invention, particularly because of their ease of preparation and superior properties of the polyesters are prepared therefrom, are those of the general formula

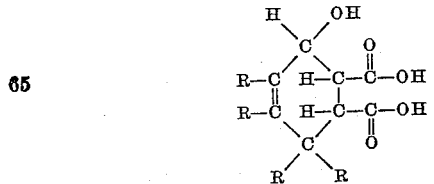

wherein R is a member of the group consisting of hydrogen and alkyl radicals, preferably those containing from 1 to 6 carbon atoms, such as 3-hydroxy-4-butyl-1,2,-

3,6-tetrahydrophthalic acid, 3-hydroxy-5-hexyl-1,2,3,6-tetrahydrophthalic acid, 3-hydroxy-4,5-diamyl-1,2,3,-6-tetrahydrophthalic acid, 3-hydroxy-4-isopropyl-1,2,3,6-tetrahydrophthalic acid, and 3-hydroxy-4,5-diisopropyl-1,2,3,6-tetrahydrophthalic acid.

The novel acids of the invention may be prepared by a variety of methods. They may be prepared in some cases by condensing a compound possessing a conjugated system of double bonds and having a hydroxyl group attached to one of the exterior carbon atoms involved in the said conjugated system with a maleic acid or maleic acid anhydride so as to form the 1,2,3,6-tetrahydrophthalic acid or anhydride and, if necessary, subjecting the compound to hydrolysis to convert the anhydride group to carboxyl groups. The hydroxy-substituted compounds possessing the conjugated system of double bonds in many cases, however, tend to undergo enolization to form the keto-substituted monoethylenically unsaturated compound, so it is generally preferred to employ an acyloxy-substituted compound having a conjugated system of double bonds in the reaction and subsequently convert the acyloxy group to the hydroxyl group. The formation of the acids by condensing the acyloxy-substituted compounds with a maleic anhydride or acid may be exemplified by the following equations showing the preparation of 3-acetoxy-5-methyl-1,2,3,6-tetrahydrophthalic acid by condensing 1-acetoxy-3-methyl-1,3-butadiene with maleic anhydride and then hydrolyzing the resulting product with an acid:

(1)
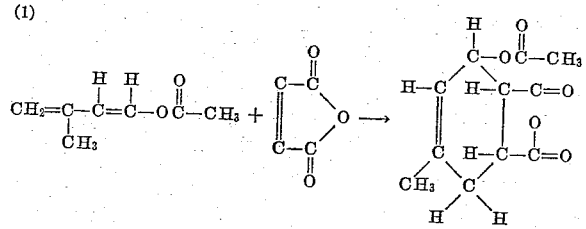

(2)
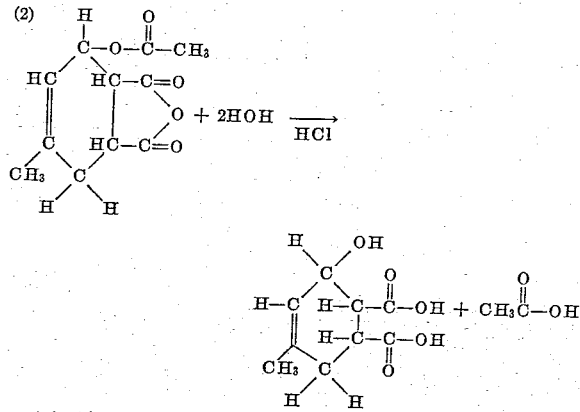

The preferred acyloxy-substituted compounds containing the conjugated system of double bonds to be utilized in the above-described method for preparing the novel acids may be exemplified by the formula

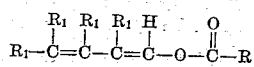

wherein R is an organic radical derived from a carboxylic acid and preferably a lower aliphatic monocarboxylic acid and each $R_1$ is a member of the group consisting of hydrogen, halogen and hydrocarbon radicals. The $R_1$ in the above-described formula will determine the radicals attached to the No. 3 to No. 6 ring carbon atoms so that they may be exemplified by the substituents disclosed for these positions on the acids described hereinabove. Examples of such compounds are 1-propionoxy-1,3-butadiene, 1-benzoxy-2,3-dibutyl-1,3-butadiene, 1-hexenoxy-3-butyl-1,3-heptadiene and 1-cyclohexanoxy-2,3-dichloro-1,3-octadiene.

If substituents other than hydrogen are desired on the No. 1 and 2 ring carbon atoms of the novel acids of the invention, the acids or anhydrides used in the above-described reaction may be a substituted maleic acid or anhydride such as methylmaleic acid, dibutylmaleic acid, dichloromaleic acid and dioctylmaleic acid. The monoalkyl-substituted and the dialkyl-substituted maleic acids wherein the alkyl group possesses from 1 to 6 carbon atoms, are particularly preferred acids to be used for this purpose.

The condensation between the acyloxy-substituted compounds containing the conjugated system of double bonds with the maleic acids or anhydrides may be carried out by contacting approximately equimolecular amounts of acyloxy-substituted compound with the maleic acid or anhydride at a temperature sufficiently high to effect the condensation within a reasonable time. In most instances, reaction temperatures ranging from about 30° C. to about 100° C. are suitable. Preferred temperatures range from about 30° C. to 50° C. The condensation may be carried out, if desired, in the presence of suitable solvents, such as aromatic hydrocarbon solvents, e. g., benzene and toluene. When the reaction is complete, the solvent, if any is present, may be removed and the adduct separated by crystallization or by fractional distillation, preferably under diminished pressure.

The hydrolysis of the corresponding acyloxy-substituted 1,2,3,6-tetrahydrophthalic acid or anhydride may be accomplished by treating the said acid or anhydride with any suitable hydrolytic agent, such as aqueous solutions of alkali, such as sodium hydroxide, sodium carbonate, potassium carbonates or dilute acids, such as dilute hydrochloric acid, dilute sulfuric acid and the like. When these hydrolytic reagents are employed, the desired hydrolytic action may be obtained by maintaining the reaction mixture at a slightly elevated temperature, e. g., temperatures between 40° C. and 60° C. until the reaction is complete. The hydroxy-substituted 1,2,3,6-tetrahydrophthalic acids may then be separated from the reaction mixture in the form of a sodium salt or in the form of the free acid. If the salt is recovered, it may be converted into the acid by proper treatment with acids, such as hydrochloric acid or sulfuric acid.

The novel acids of the invention are normally colorless, crystalline solids which have relatively high melting points, e. g., 100° C. to 250° C., and are soluble in a variety of different organic solvents. As indicated above, the acids are useful as medicaments or as intermediates in making medicaments and may be used as textile treatment agents and as intermediates in the preparation of various dyes and pesticidal compositions. They may also be halogenated by reaction with free chlorine or bromine to form halogenated derivatives which are of value as solvents, emulsifying and wetting agents and as plasticizers for various organic resinous materials. They may also be used to produce valuable salt derivatives. Salts of the acids and metals, such as cobalt, iron, manganese and lead may be used, for example, as paint driers and as stabilizers for halogen-containing polymers, such as polyvinyl chloride. Salts of the acids and metals, such as copper and mercury may be used as insecticides and wood preserving agents, or as additives for lubricating oils, etc.

The novel acids of the invention are particularly valuable, however, in the preparation of valuable monomeric esters and polyester-type products. The polyesters may be prepared from the novel acids themselves, from acid esters of such acids, or by reacting the novel acids with polyhydric alcohols, such as glycerol, ethylene glycol, 1,3,5-hexanetriol, pentaerythritol, polyvinyl alcohol, polyallyl alcohol and the like. The polyesters are preferably prepared by heating the desired reactants as indicated above in the presence of an acid or acid-acting catalyst. Catalysts that may be used for this purpose include zinc chloride, stannic chloride, hydrochloric acid, sulfuric acid, p-toluenesulfonic acid, and the like, and mixtures thereof. Such catalysts are preferably employed in amounts varying from 0.1% to 5% by weight of the reactants but larger amounts may be used if desired or necessary.

When the polyesters are prepared directly from the acid or its acid ester, it is generally preferred to conduct the reaction in the presence of another material, such as acetic anhydride, propionic anhydride and butyric anhydride or benzene, toluene, xylene and the like.

Various modifying agents may also be added to the reaction mixture as desired. When polyesters are prepared from the novel acids and polyhydric alcohols, the products are preferably modified by the addition of fatty acids derived from drying oils as linseed, soybean, perilla, tung, walnut and oiticica oil, mono- and diglycerides of these acids as well as the oils themselves. Non-drying modifying agents, such as cocoanut, castor and cottonseed oils, carboxylic acids, such as lactic, benzoic, chlorobenzoic, stearic, salicylic, mucic, sorbic, and propionic acids may also be used to modify these products.

When preparing polyesters from the novel acids, the polyhydric alcohols and the above-described modifying agents, better products are generally obtained when the acid is reacted with from 1 to 1.5 equivalents of the alcohol. The modifying agent is preferably employed in an amount varying from 10% to 90% by weight of the acid and alcohol reactants and preferably from 25% to 60% by weight of these reactants.

The temperature employed during the formation of the polyesters may vary over a considerable range depending upon the type of reactants and catalyst. In most cases, the temperature will range from about 100° C. to about 300° C., with a preferred range varying from 120° C. to about 250° C. Higher or lower temperatures may be employed, however, if desired or necessary.

The water formed during the reaction during the polyester formation may be removed during the reaction or when the reaction is completed. It is preferably removed from the reaction mixture substantially as fast as it is formed therein. The removal of the water may be accomplished by various means, such as distillation, and the like.

When the reaction is complete, the solvents or diluents and any remaining water or unconverted reactants are preferably removed leaving the polyester in the reaction kettle. Removal is conveniently effected by vacuum distillation, although other means known to the art may be utilized.

The novel acids of the invention may also be used to prepare valuable monomeric ester derivatives. Thus, the novel acids of the invention may be reacted with monohydric alcohols to produce products which are valuable as plasticizers for synthetic resins and rubber and as intermediates for the formation of polymeric products. Examples of alcohols that may be employed for this purpose include methyl alcohol, ethyl alcohol, butyl alcohol, amyl alcohol, decyl alcohol, cyclohexanol, allyl alcohol, methallyl alcohol, 2-butenol, cyclopentenol, phenol, benzyl alcohol, glycol monoacetate and the like.

Particularly preferred, because of their fine plasticizing properties are the esters of the novel acids and monohydric alcohols containing from 4 to 14 carbon atoms, such as amyl alcohol, hexyl alcohol, nonyl alcohol, dodecyl alcohol and tetradecyl alcohol. The esters of the alkanols containing from 4 to 10 carbon atoms are particularly preferred for this application. These preferred esters may be exemplified by dioctyl 3-hydroxy-1,2,3,6-tetrahydrophthalate, diamyl 3-hydroxy-5-butyl-1,2,3,6-tetrahydrophthalate, dinonyl 3-hydroxy-4,5-diethyl-1,2,3,6-tetrahydrophthalate, and dihexyl 3-hydroxy-5-amyl-1,2,3,6-tetrahydrophthalate.

The esters of the novel acids and the unsaturated alcohols, such as allyl alcohol and methallyl alcohol, come under special consideration because they may be polymerized by themselves or with certain proportions of other unsaturated organic compounds to produce polymers having many valuable properties. Esters of the novel acids and the beta,gamma-ethylenically unsaturated aliphatic monohydric alcohols containing from 3 to 12 carbon atoms, and particularly the 2-alkenols containing from 3 to 8 carbon atoms, are particularly preferred for this purpose. Examples of such esters include diallyl 3-hydroxy-1,2,3,6-tetrahydrophthalate, dimethallyl 3-hydroxy-5-hexyl-1,2,3,6-tetrahydrophthalate, dichloroallyl-3-hydroxy-4,5-diethyl-1,2,3,6-tetrahydrophthalate, and allyl methallyl 3-hydroxy-5-butyl-1,2,3,6-tetrahydrophthalate.

The monomeric esters may be prepared by a variety of different methods. They may be prepared, for example, by reacting the acid or acid anhydride with the alcohol, by reacting an acid chloride with the alcohol or by reacting a sodium salt of the acid with a halide corresponding to the desired alcohol. These esters may also be prepared by condensing an acyloxy-substituted compound containing a conjugated system of double bonds with the desired ester of a maleic acid and then removing the acyloxy group by hydrolysis.

The novel esters are preferably prepared by a direct esterification process wherein the above-described acids or their anhydrides are reacted with the desired alcohol in the presence of an esterification catalyst, and in some cases in the presence of an azeotrope agent which assists in removing the water formed in the reaction. Catalysts that may be utilized in this process may be exemplified by p-toluenesulfonic acid, benzenesulfonic acid, hydrobromic acid, chloroacetic acid, sulfuric acid, formic acid, boron and silicon fluorides, acid salts, such as monosodium sulfate and salts of strong acids and weak bases, such as zinc chloride and zinc sulfate. The amount of the catalyst employed will vary over a wide range depending on the particular type of reactants, type of catalyst selected and reaction conditions employed. In most cases, the amount of catalyst will vary from 0.1% to 5% by weight of the reactants, and more preferably from 0.5% to 3% by weight of the reactants.

The amount of the acid or anhydride and the alcohol employed in the esterification reaction may vary over a wide range depending upon the reactants and types of products desired. In general, at least one mole, and preferably from 1.1 to 2 moles, of alcohol should be employed for every carboxyl group to be esterified. It may be desirable, however, in some cases to employ larger amounts of the alcohol so that it might be removed during the reaction in admixture with the water and azeotrope former.

In the case of the unsaturated alcohols it may be desirable to accomplish the esterification in the presence of a polymerization inhibitor, such as copper bronze powder, sulfur, p-phenylenediamine, hydroquinone, tannic acid and various amino and sulfur compounds. These inhibitors may be subsequently removed by washing, distillation, extraction and the like.

The temperature employed during the esterification process may also vary over a considerable range. As a general proposition, temperatures ranging from 50° C. to 200° C. may be used in the process, with temperatures ranging from 90° C. to 150° C. being more preferred. Atmospheric, subatmospheric or superatmospheric pressures may be employed as desired. In those cases where it is desirable to prevent the subsequent polymerization of the esters, it is usually advisable to avoid the use of pressures which might accelerate the polymerization.

The water formed during the esterification may be removed during or at the completion of the process. The removal of the water may be accomplished by methods well known in the art. It is usually preferred to utilize an azeotrope former and remove the water of esterification during the process by azeotropic distillation.

The esters may be recovered and purified by any suitable method, such as distillation, extraction, crystallization and the like.

The monomers that may be polymerized with the above-described unsaturated esters may be any monomer containing at least one $CH_2=C=$ group, such as acrylonitrile, methacrylonitrile, vinyl chloride, methyl methacrylate, vinyl acetate, allyl acetate, allyl chloride, diallyl phthalate, diallyl succinate, vinyl caproate, butadiene, and the like. The proportions used in preparing the copolymers may vary over a wide range depending on the monomers selected, but in most cases the desired polymers are obtained by combining the above-described unsaturated esters with from 15% to 90% by weight of the other monomer or monomers.

The homopolymerization and copolymerization may be accomplished by merely heating the monomer or monomers in the presence of a polymerization catalyst. The polymerization may be effected in bulk, in the presence of solvents or in an aqueous emulsion or suspension. If solvents are employed, they may be solvents for the monomers and polymers or solvents for the monomer and non-solvents for the polymer. Example of solvents that may be used include benzene, toluene, cumene, dioxane and the like.

Oxygen-containing polymerization catalysts are effective in accelerating the polymerization of the compounds of the invention. Illustrative examples of such catalysts are benzoyl peroxide, acetyl peroxide, acetyl benzoyl peroxide, lauryl peroxide, dibutyl peroxide, succinyl peroxide, sodium peroxide; tertiary alkyl hydroperoxides, such as tertiary butyl hydroperoxide, peracetic acid, perphthalic acid, perborates, and the like. Another class of polymerization catalysts which are effective is the di(tertiary alkyl) peroxides such as di(tertiary butyl) peroxide. The polymerization may be accomplished in the presence of mixtures of polymerization catalyst as benzoyl peroxide and hydrogen peroxide, for example, or it may be accomplished in the presence of both a catalyst and a polymerization inhibitor.

The temperatures employed in the catalyst will generally depend on the type of catalyst selected and the desired rate of polymerization. In general, the temperature employed will vary from about 50° C. to 150° C., and more preferably from 65° C. to 125° C.

If the novel esters used to prepare the polymers possess at least two ethylenic linkages, the polymerization may be interrupted when the soluble, fusible polymer has been formed and the mixture containing this polymer may then be transferred to a mold or used to impregnate porous materials, etc. and the polymer then cured by use of heat and pressure to form the infusible, soluble polymer.

To illustrate the manner in which the invention may be carried out, the following examples are given. It is to be understood, however, that the examples are for the purpose of illustration and the invention is not to be regarded as limited to any of the specific conditions or reactants cited therein. Unless otherwise specified, parts described in the examples are parts by weight.

*Example I*

About 3 parts of 1-acetoxy-3-methyl-1,3-butadiene is mixed with about 2 parts of maleic anhydride and the resulting mixture heated at about 50° C. for 30 minutes. The white crystalline product that separates out is removed by filtration and purified by washing with a solvent and drying. The product is identified as 3-acetoxy-5-methyl-1,2,3,6-tetrahydrophthalic anhydride.

The 3-acetoxy-5-methyl-1,2,3,6-tetrahydrophthalic anhydride produced above is added to a 1% aqueous solution of sodium carbonate and the mixture maintained at 40° C. for about 30 minutes. The mixture is then acidified with hydrochloric acid to convert the disodium salt to the acid form. The solid that separated is filtered and dried. Analysis of the product indicates that it is 3-hydroxy-5-methyl-1,2,3,6-tetrahydrophthalic acid.

About 1 equivalent of the 3-hydroxy-5-methyl-1,2,3,6-tetrahydrophthalic acid produced above is mixed with 2 equivalents of acetic anhydride and 1% by weight of the reactants of zinc chloride and the mixture heated at 200° C. for about 10 hours. The resulting product is a solid relatively high molecular weight polyester possessing a plurality of free carboxyl groups.

*Example II*

About 4 parts of 1-acetoxy-1,3-butadiene is mixed with 2.5 parts of maleic anhydride and the mixture heated at about 50° C. to 60° C. for 30 minutes. The white crystalline product that separates is removed by filtration and purified by washing with a solvent and drying. The product is identified as 3-acetoxy-1,2,3,6-tetrahydrophthalic anhydride.

The 3-acetoxy-1,2,3,6-tetrahydrophthalic anhydride produced above is added to a 1% aqueous solution of sodium carbonate and the mixture maintained at 40° C. for 1 hour. The mixture is then acidified with hydrochloric acid to convert the disodium salt to the acid form. The solid that separates is identified as 3-hydroxy-1,2,3,6-tetrahydrophthalic acid.

About 1 mole of the 3-hydroxy-1,2,3,6-tetrahydrophthalic acid is mixed with 1.5 moles of glycerol and the mixture heated in a metal bath. The temperature is raised from about 150° C. to 250° C. and then held at that temperature until the reaction is substantially complete. A stream of carbon dioxide is sent through the charge to remove air and carry away the water of esterification. At the completion of the reaction, vacuum is applied to remove the unreacted glycerol. The resulting product is a relatively high molecular weight alkyd resin.

The resin produced above is combined with an equal weight of nitrocellulose in a solvent comprising butyl acetate, ethyl acetate, butyl alcohol, toluene and low aromatic petroleum lacquer diluent, and films of the solution cast on tin panels. The films dry in a short period to form hard films.

*Example III*

About 4 parts of 1-propionoxy-2,3-diethyl-1,3-butadiene is mixed with 2 parts of maleic anhydride and the mixture heated at 60° C. The white crystalline product that separates is removed by filtration and purified as shown in the preceding example. The product recovered is identified as 3-propionoxy-4,5-diethyl-1,2,3,6-tetrahydrophthalic anhydride.

The 3-propionoxy-4,5-diethyl-1,2,3,6-tetrahydrophthalic anhydride is added to a 1% aqueous solution of sodium carbonate and the mixture maintained at 40° C. for about 1 hour. The mixture is then acidified with hydrochloric acid and the solid that separates is filtered and dried. Analysis of the product indicates that it is 3-hydroxy-4,5-diethyl-1,2,3,6-tetrahydrophthalic acid.

The 3-hydroxy-4,5-diethyl-1,2,3,6-tetrahydrophthalic acid is mixed with an approximately equal molecular quantity of allyl alcohol, 3% by weight of the reactants of p-toluenesulfonic acid and twice the weight of the reactants of benzene and the mixture heated under reflux. The water formed during the reaction is removed by azeotropic distillation with the benzene. At the end of the reaction, a granular material identified as monoallyl 3-hydroxy-4,5-diethyl-1,2,3,6-tetrahydrophthalate is recovered. This acid ester is mixed with benzene and 1% zinc chloride and the mixture heated at 200° C. for about 10 hours. The benzene is removed to yield a linear high molecular weight polyester. Nitrocellulose compositions containing this polyester dry in a short period to form hard strong films.

The monoallyl 3-hydroxy-4,5-diethyl-1,2,3,6-tetrahydrophthalate is treated with a further quantity of allyl alcohol by the method shown above to produce diallyl 3-hydroxy-4,5-diethyl-1,2,3-6 - tetrahydrophthalate. This unsaturated ester is then polymerized in the presence of 2% benzoyl peroxide to form a hard, insoluble, infusible polymer.

*Example IV*

About 3 parts of 1-propionoxy-3-methyl-1,3-butadiene is mixed with 2 parts of maleic anhydride and the mixture heated at 60° C. The product that separates is removed by filtration and purified as shown in the preceding example. The product is identified as 3-propionoxy-5-methyl-1,2,3,6-tetrahydrophthalic acid anhydride.

The 3-propionoxy-5-methyl-1,2,3,6-tetrahydrophthalic acid anhydride is added to a 1% aqueous solution of sodium carbonate and the mixture maintained at 40° C. for a short period. The mixture is then acidified with hydrochloric acid and the solid that separates is filtered and dried. Analysis of the product indicates that it is 3-hydroxy - 5 - methyl - 1,2,3,6 - tetrahydrophthalic acid.

One equivalent of the 3-hydroxy-5-methyl-1,2,3,6-tetrahydrophthalic acid is combined with about 1.5 equivalents of linseed oil fatty acid and 2.5 equivalents of glycerol and the mixture heated between 170° C. and 260° C. The resulting alkyd dries in a short period to form a hard film.

About one equivalent of the 3-hydroxy-5-methyl-1,2,3,6-tetrahydrophthalic acid is heated with 2.5 equivalents of allyl alcohol in the presence of 3% by weight of p-toluenesulfonic acid. The resulting diallyl ester is then polymerized in the presence of 2% benzoyl peroxide to form a hard, insoluble, infusible polymer.

We claim as our invention:
1. A process for preparing an acid of the formula

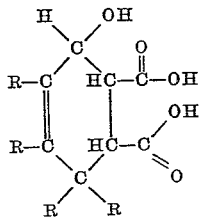

wherein R is a member of the group consisting of hydrogen and alkyl radicals containing from 1 to 6 carbon atoms, which comprises treating a member of the group consisting of the corresponding 3-acyloxy-substituted 1,2,-3,6-tetrahydrophthalic acid and its anhydride with a dilute aqueous solution of an alkaline hydrolytic reagent at a temperature between 40° C. and 60° C. and then acidifying the resulting mixture.

2. A process for preparing 3-hydroxy-5-alkyl-1,2,3,6-tetrahydrophthalic acid which comprises treating the corresponding 3-acyloxy-5-alkyl-1,2,3,6-tetrahydropthalic acid anhydride with a dilute aqueous solution of an alkaline hydrolytic reagent at a temperature between 40° C. and 60° C. and then acidifying the resulting mixture.

References Cited in the file of this patent
UNITED STATES PATENTS

| | | |
|---|---|---|
| 1,860,730 | Brooks et al. | May 31, 1932 |
| 2,155,639 | Bradley | Apr. 25, 1939 |
| 2,221,663 | Rothrock | Nov. 12, 1940 |
| 2,251,297 | Soday | Aug. 5, 1941 |
| 2,251,298 | Soday | Aug. 5, 1941 |
| 2,262,002 | Hopff et al. | Nov. 11, 1941 |
| 2,275,034 | Moyle | Mar. 3, 1942 |
| 2,275,383 | Soday | Mar. 3, 1942 |
| 2,450,627 | Bloch | Oct. 5, 1948 |
| 2,474,686 | Neher et al. | June 28, 1949 |
| 2,475,557 | Swern et al. | July 5, 1949 |
| 2,501,610 | Norris et al. | Mar. 21, 1950 |
| 2,632,011 | Finch | Mar. 17, 1953 |

FOREIGN PATENTS

| | | |
|---|---|---|
| 493,196 | Great Britain | Oct. 4, 1938 |
| 695,865 | Germany | Sept. 4, 1940 |
| 739,438 | Germany | Sept. 28, 1943 |

OTHER REFERENCES

Richter: Textbook of Organic Chemistry (1938 ed.), pp. 190 and 575.
Chemical Abstracts 35, 5520 (1941).
Vollmann et al.: Chem. Abs., vol. 39, p. 2079 (1945).
Klebanskii et al.: Chem. Abs., vol. 41, p. 2693 (1947).